US005547508A

United States Patent [19]
Affinito

[11] Patent Number: 5,547,508
[45] Date of Patent: Aug. 20, 1996

[54] VACUUM DEPOSITION AND CURING OF LIQUID MONOMERS APPARATUS

[75] Inventor: John D. Affinito, Kennewick, Wash.

[73] Assignee: Battelle Memorial Institute, Richland, Wash.

[21] Appl. No.: 341,803

[22] Filed: Nov. 17, 1994

Related U.S. Application Data

[60] Division of Ser. No. 100,883, Aug. 2, 1993, Pat. No. 5,395,644, which is a continuation-in-part of Ser. No. 933,447, Aug. 21, 1992, Pat. No. 5,260,095.

[51] Int. Cl.$^6$ ................................................ C23C 14/00
[52] U.S. Cl. .................. 118/50; 118/641; 118/58; 118/64; 118/66; 118/110; 118/300
[58] Field of Search ........................... 118/50, 641, 58, 118/64, 66, 612, 110, 118, 200, 244, 300, 413; 427/124, 126.3, 255.5, 255.6, 294; 156/285, 382

[56] References Cited

U.S. PATENT DOCUMENTS

| | | | |
|---|---|---|---|
| 3,467,060 | 9/1969 | Kubanon et al. | 118/58 |
| 4,685,415 | 8/1987 | Wegner | 118/58 |
| 4,842,893 | 6/1989 | Yializis et al. | 427/497 |
| 4,899,686 | 2/1990 | Toshima et al. | 118/50 |
| 4,924,800 | 5/1990 | Tanaka | 118/58 |
| 5,131,460 | 7/1992 | Krueger | 118/50 |
| 5,286,294 | 2/1994 | Ebi et al. | 118/50 |

*Primary Examiner*—Laura Edwards
*Attorney, Agent, or Firm*—Paul W. Zimmerman

[57] ABSTRACT

The present invention is the formation of solid polymer layers under vacuum. More specifically, the present invention is the use of "standard" polymer layer-making equipment that is generally used in an atmospheric environment in a vacuum, and degassing the monomer material prior to injection into the vacuum. Additional layers of polymer or metal or oxide may be vacuum deposited onto solid polymer layers. Formation of polymer layers under a vacuum improves material and surface characteristics, and subsequent quality of bonding to additional layers. Further advantages include use of less to no photoinitiator for curing, faster curing, fewer impurities in the polymer electrolyte, as well as improvement in material properties including no trapped gas resulting in greater density, and reduced monomer wetting angle that facilitates spreading of the monomer and provides a smoother finished surface.

14 Claims, 2 Drawing Sheets

VACUUM DEPOSITION AND CURING OF LIQUID MONOMERS APPARATUS

This invention was made with Government support under Contact DE-AC06-76RLO 1830 awarded by the U.S. Department of Energy. The Government has certain rights in the invention.

This patent application is a division of application Ser. No. 08/100,883, filed Aug. 02, 1993, now U.S. Pat. No. 5,395,644 which is a continuation-in-part of patent application Ser. No. 07/933,447, filed Aug. 21, 1994, now Pat. No. 5,260,095, issued Nov. 03, 1993.

FIELD OF THE INVENTION

The present invention relates generally to a method of making multi-layer laminate structures from polymers and metals and/or oxides. More specifically, the present invention relates to forming solid polymer laminate layers under vacuum. Additional layers of polymer or metal or oxide may be added under vacuum as well.

BACKGROUND OF THE INVENTION

Laminate structures are used in many applications including but not limited to electronic devices, packaging material, and solar reflectors. Laminate structures in electronic devices are found in devices including but not limited to circuit elements and electrochromic devices wherein conductive polymer layers are combined and may include a metal layer and/or an oxide layer. Electro- chromic devices include but are not limited to switchable mirrors and switchable windows. Circuit elements include active elements, for example fuel cells and batteries, and passive elements, for example capacitors.

Presently, many laminate structures are made with solid polymer laminate layers. In packaging material and solar reflectors, a metal layer may be added to enhance optical reflectance. In electronic devices, a metal layer may be added to enhance electrical conductivity. In pack- aging material and solar reflectors, it is not necessary that the polymer layer or layers be conductive, whereas in electronic devices, especially batteries, the polymer layers must be conductive to act as electrolytes, anodes, and cathodes. Certain polymers when doped with selected salts are known to make suitable solid polymer ion conduc- tive layers. Polymers known to be useful include but are not limited to polyethyleneoxide, polypropyleneoxide, polyorgansulfides, and polyanaline. Suitable salts include but are not limited to lithium salts, for example lithium perchlorate, and lithium hexafluoroarsenate. Although the anode, cathode, and electrolyte layers may all be of solid polymer material, when making a lithium polymer battery, it is preferred to have a layer of lithium metal as an anode.

Laminate structures further include electrochromic devices wherein an electrolyte is sandwiched between electrochromic oxide layers. Conductive layers are placed on the electrochromic oxide layers for connection to an electrical power source. Additional structural or protective layers may be added to enclose an electro- chromic assembly.

Other polymers having added compounds, including but not limited to conductive powders and dyes, may be made by the present invention.

Presently, mass production of polymer and metal laminate structures used for electronic devices, and especially batteries, relies upon assembling preformed layers of polymer with a thin metal foil. Polymer layers are formed in production quantities by depositing a thin layer of a monomer onto a moving substrate that carries the monomer layer while and until it is cured. Many means for forming polymer layers are available, including but not limited to physical or mechanical liquid-monomer spreading spreading apparati; for example, roll coaters, gravure roll coaters, wire wound rods, doctor blades, and slotted dies, as well as means for evaporation and deposition of a monomer vapor, for example polymer multilayer deposition. In any means having a moving substrate, the substrate has a velocity different from a nozzle or bath that deposits the liquid monomer onto the substrate. Hence, the term "moving substrate" as used herein excludes a situation wherein there is no relative motion or velocity differential between substrate and liquid-monomer dispensing means.

The polymer multilayer deposition technique is distinct from liquid-monomer spreading techniques because polymer multilayer deposition requires flash evaporation of the monomer. First, a monomer is atomized into a heated chamber that is under vacuum. Within the heated chamber the monomer droplets are evaporated, then exit the heated chamber, and monomer vapor condenses upon a substrate and is subsequently cured.

Curing may be done by any means including but not limited to heat, infrared light, ultraviolet light, electron beam, and other radiation.

When fabricating a battery, several techniques are used to combine a thin metal layer with a conductive polymer layer. One technique of battery fabrication is to combine a metal foil with a conductive polymer layer by press bonding a metal foil layer to a solid conductive polymer layer. Another technique is to spread uncured conductive monomer onto a metal foil and subsequently cure the conductive monomer to form a solid conductive polymer layer. Use of metal foil, especially lithium metal foil, results in minimum metal thicknesses of from about 1.5 mils (40 micrometers) to about 2 mils (50 micrometers).

Other battery fabrication techniques include making a thin metal layer by sputtering, plating, or vacuum depositing metal onto a metal substrate. A conductive polymer is then placed in contact with the metal. Either solid conductive polymer or uncured conductive monomer may be brought into contact with the metal to form the battery. Polymer laminate structures, including but not limited to batteries, are made by a procedure wherein individual layers are sequentially and separately formed then combined.

The performance and lifetime of polymer/polymer and polymer/metal laminate structures depend upon the quality of bonding between laminate layers. Bonding quality is affected by the presence of small, even microscale, areas of non-bonding at an interface between laminate layers. The bonding is especially critical between dissimilar layers; for example, polymer and metal layers. In batteries, reduced bond quality between polymer and lithium metal layers results in greater internal resistance of a battery produced with the laminate material and potential for "hot spots" upon recharging. In any structure, another problem with bonding dissimilar materials is chemical interaction between the materials. Areas of non-bonding can enhance chemical interaction because they may contain non-inert species or provide different surface characteristics at a boundary between bonded and unbonded areas.

Bonding between layers is therefore of great importance and is enhanced by several means, including but not limited to mechanical presses, and application of a second layer as a liquid with subsequent solidification upon a first solid layer at atmospheric pressure. The difficulty with these methods is that the low cost assembly of pressing or liquid application leads to low quality bonding as identified in U.S. Pat. No. 4,098,965, issued Jul. 4, 1976, to Kinsman, column 1, lines 47–50, wherein he states "[g]ases usually air, [that] are included in the void regions of the battery during assembly . . .".

Likewise, bonding between layers within electrochromic devices and other laminate structures is directly related to the performance of the devices.

It is of great interest to those skilled in the art, then, to make batteries and other laminate structures having high bond quality while making them in a cost effective manner.

SUMMARY OF THE INVENTION

The present invention is the formation of solid polymer layers under vacuum. More specifically, according to a first aspect of the present invention, "standard" polymer-layer making equipment that is generally used in an atmospheric environment is placed in a vacuum, with an additional step of degassing the monomer material prior to injection into the vacuum. Additionally, other layers of polymer or metal or oxide may be vacuum deposited onto solid polymer layers.

Advantages of forming polymer layers in a vacuum include use of less to no photoinitiator for curing, faster curing, and fewer impurities in the polymer. Further advantages are improvement in material properties, including no trapped gas, resulting in greater density and reduced monomer wetting angle that facilitates spreading of the monomer and provides a smoother finished surface.

According to a second aspect of the invention, fabrication of laminate structures are carried out nearly simultaneously within a single vacuum chamber.

The subject matter of the present invention is particularly pointed out and distinctly claimed in the concluding portion of this specification. However, both the organization and method of operation, together with further advantages and objects thereof, may best be understood by reference to the following detailed description.

DESCRIPTION OF THE PREFERRED EMBODIMENT(S)

Figure 1:
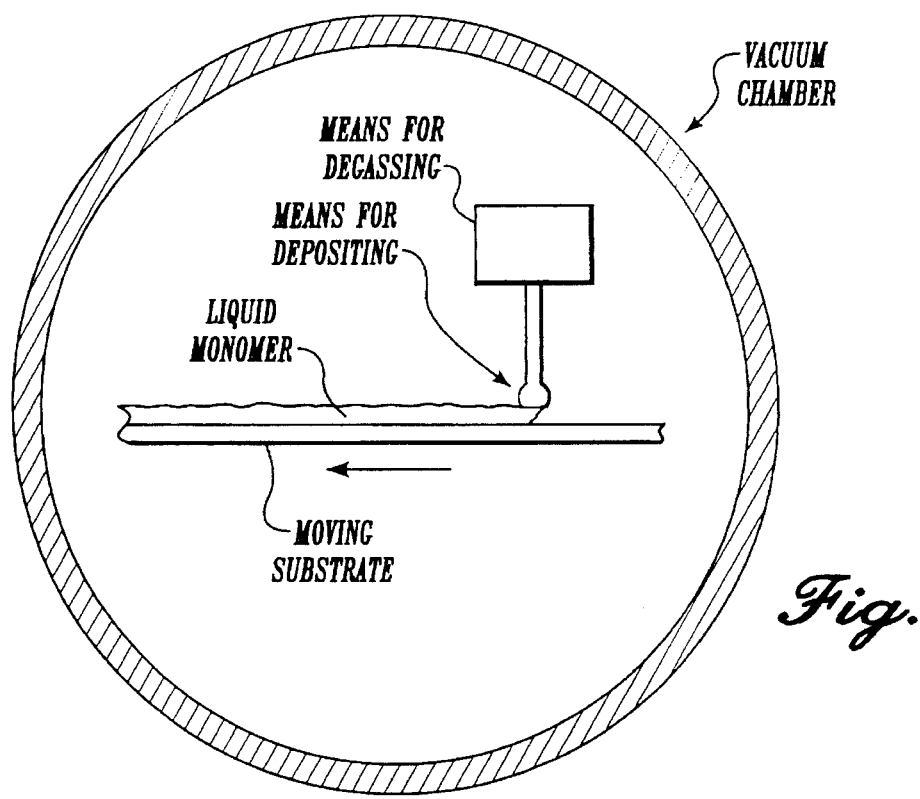
FIG. 1 is a cross section of a preferred emodiment of the present invention.
Figure 2:
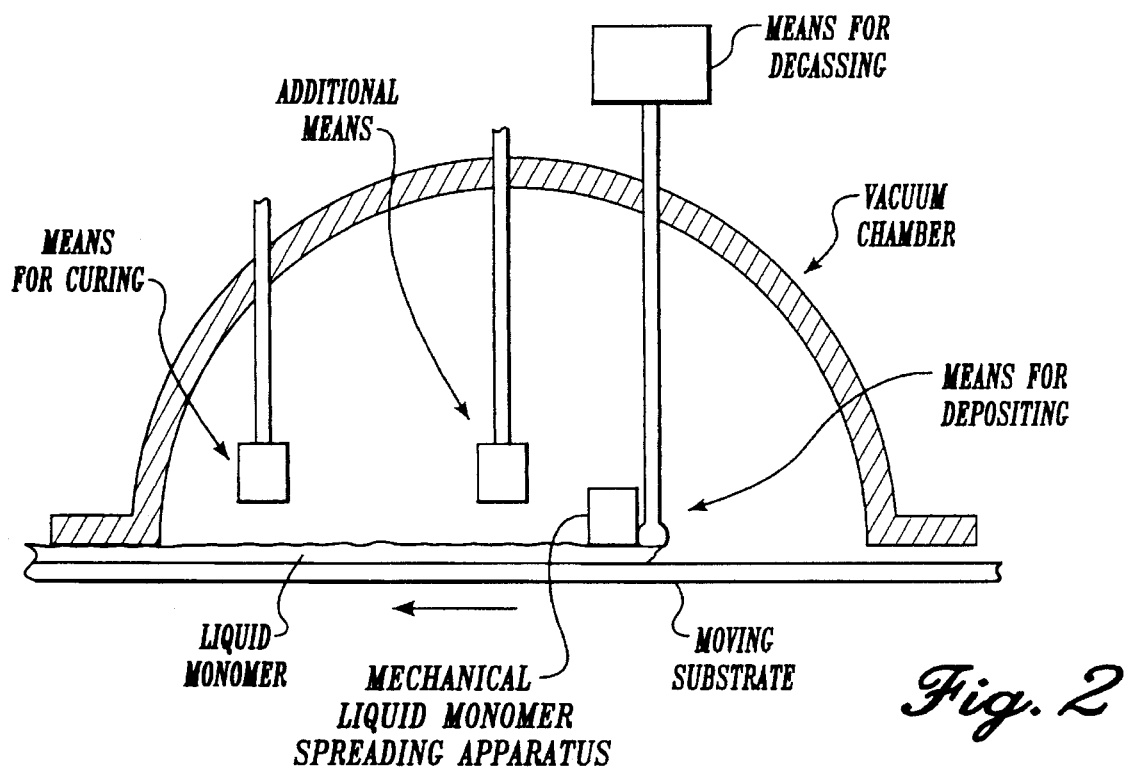
FIG. 2 is a partial cross section including a mechanical liquid monomer spreading apparatus.
Figure 3:
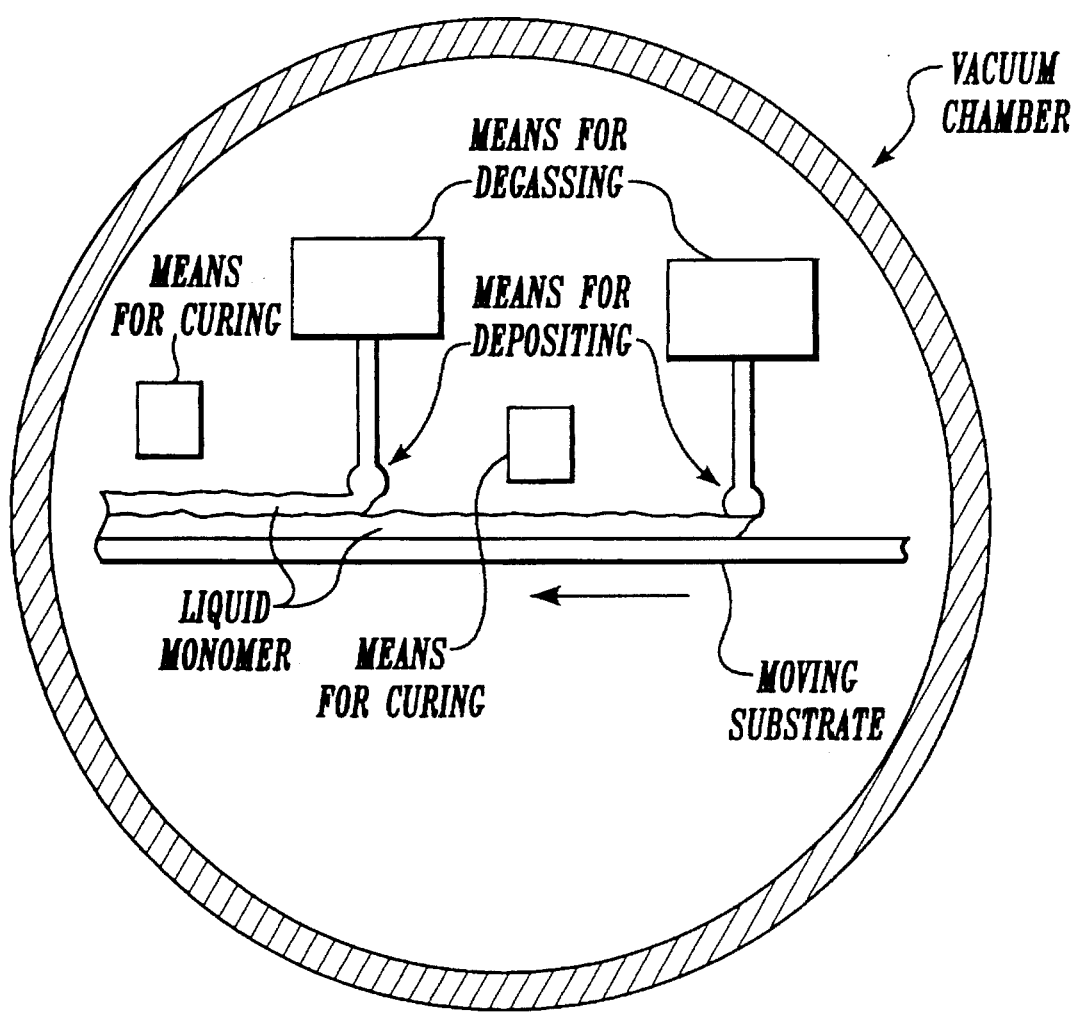
FIG. 3 is a cross section having additional means for depositing degassed liquid monomer.

The method of the present invention is making a solid polymer layer by utilizing two known steps in combination with two additional steps that had not been combined prior to the present invention. The known steps of depositing a thin layer of liquid monomer onto a moving substrate followed by curing said monomer and forming the solid polymer layer, are combined with the steps of (a) placing the moving substrate into a vacuum chamber, and (b) degassing the monomer prior to depositing the degassed monomer onto the moving substrate in the vacuum chamber.

The substrate may be a temporary substrate from which the solid polymer layer product is removed after curing, or the substrate may be a permanent substrate forming part of the final product. The permanent substrate can be as simple as a base polymer layer having a metalized surface, for example, a solar reflector. The present invention may be used to place a protective coating upon the metallic surface. The permanent substrate may be as complex as a many-layered monolithic electronic device, for example, a capacitor in which the present invention may be used to place multiple polymer and metal layers to construct the device.

According to the present invention, any polymer-layer making method done in air or other atmosphere may be adapted to be carried out in a vacuum.

The apparatus of the present invention is a combination of known means with additional means that had not been combined prior to the present invention. Apparatus for making a solid polymer layer includes a moving substrate together with means for depositing a thin layer of liquid monomer onto the moving substrate, followed by means for curing the liquid monomer and forming the solid polymer. These means are combined with (a) means for creating a vacuum about the moving substrate, and (b) means for degassing the liquid monomer prior to depositing the degassed liquid monomer onto the moving substrate in the vacuum.

For making a polymer/metal laminate structure, the metal is vacuum deposited onto a cured solid polymer layer. Alternatively, the metal may be vacuum deposited onto a substrate, then liquid monomer deposited and spread under vacuum onto the metal surface. Any vacuum deposition technique may be used, but electron beam evaporation is preferred, especially for vacuum deposition of lithium metal. While any metal thickness is achievable with vacuum deposition techniques, a practical range of thickness is from about 10 angstroms to about 0.4 mils (10 micrometers). For making a lithium polymer battery, it is preferred that the cathode and electrolyte are conductive polymer layers and that the anode is lithium metal.

For making additional polymer/oxide laminate structure, the oxide is vacuum deposited onto a cured solid polymer layer. Any oxide vacuum deposition technique may be used, but reactive sputtering is preferred to maintain composition of the oxide layer and improved control over film structure.

Creating a vacuum about a moving substrate may be done in many ways, including housing an entire solid polymer-making apparatus in a vacuum chamber. Alternatively, a vacuum chamber may contain a moving substrate and a nozzle or coating head penetrating a wall of the vacuum chamber for admitting liquid monomer material.

Degassing of the liquid monomer may be carried out in any way, but it is preferred that the monomer be degassed by stirring it in a sealed vessel and removing residual gas with a vacuum pump. The vacuum pump draws a vacuum of a pressure that removes a sufficient quantity of gas from the liquid monomer to permit smooth flow of the liquid monomer through a nozzle into the vacuum chamber with reduced entrained gas expansion, thereby preventing intermittent nozzle discharge, or spitting. The amount of entrained gas must also be sufficiently low to result in an acceptable quality polymer. Acceptable quality includes but is not limited to the final polymer being free of void spaces and exhibiting a smooth surface.

The vacuum chamber may admit several liquid-monomer and other material inlets for permitting multiple monomer/polymer layers, curing means, as well as metal and/or oxide vacuum deposition means. With a multiple inlet vacuum chamber, laminate structures are made in one pass through the chamber. For example, a polymer layer may be cured, then a second metallic or oxide layer deposited, and a subsequent polymer layer covering the second surface put in place, all within the vacuum chamber. Multiple passes of a product through the vacuum chamber can develop stacks of layered sets.

By placing liquid monomer spreading and vapor deposition of metal and/or oxide layer in the same vacuum chamber, the substrate velocity may be adjusted to accommodate both processes. Additionally, the flow of material through a nozzle may be adjusted to accommodate both processes. Similarly, vacuum pressure is set low enough to permit metal and/or oxide deposition.

A lithium polymer battery requires a minimum of three layers, anode (lithium metal) electrolyte polymer, and cathode polymer, respectively. Additional layers include a cathode current collector metal layer, and an anode current collector metal layer. The metal layers can be of any metal or metal alloy but are preferably metals or alloys that are chemically compatible and highly electrically conductive, for example gold, silver and copper. Moreover, first and second polymer insulating layers may be deposited onto the current collectors to form a cell. Cells may be stacked with or without intervening polymer insulating material.

Thus, a method of making a lithium polymer battery, according to the present invention has a minimum of six steps. The first three steps are equipment arrangement steps of (a) placing a moving substrate into a vacuum chamber, (b) placing a mechanical liquid-monomer spreading apparatus into the vacuum chamber, and (c) degassing a liquid monomer cathode material. The next three steps are material deposition steps of (d) depositing a thin layer of the liquid monomer cathode material onto the moving substrate, (e) curing the monomer cathode material and forming a solid cathode polymer, and (f) depositing and curing a thin layer of monomer electrolyte material onto said cathode, forming a solid polymer electrolyte with subsequent deposition of lithium metal onto said electrolyte, forming an anode.

For particular applications requiring current collectors and protective insulating layers, two steps may precede the material deposition steps. Specifically, the additional steps of (g) depositing a first monomer insu- lating material layer onto the moving substrate and curing the first monomer insulating material layer in advance of step (d) deposition of monomer cathode, and (h) depositing a cathode current collector metal onto the cured insulating material in advance of step (d) deposition of monomer cathode. Additionally, two steps may follow the material deposition steps, vis the steps of (i) depositing an anode current collector onto the anode, and (j) depositing a second monomer insulating layer onto the anode current collector and curing the second monomer insulating layer.

Electrochromic devices are similar to lithium polymer batteries in the aspect of an electrolyte layer combined with conductive layers. However, the specific layers are distinct so that the method of making electrochromic devices according to the present invention has the same equipment arrangement steps of (a) placing a moving substrate into a vacuum chamber, (b) placing a mechanical liquid-monomer spreading apparatus into the vacuum chamber, and (c) degassing a liquid monomer electrolyte material. However, the material deposition steps are (d) depositing a first conductive oxide layer onto the moving substrate, (e) depositing a first electrochromic oxide layer onto the first conductive oxide layer, (f) depositing the liquid monomer electrolyte material onto the first electrochromic oxide layer, (g) curing the liquid monomer electrolyte to a solid polymer electrolyte, (h) depositing a second electrochromic oxide layer onto the solid polymer electrolyte, and (i) depositing a second conductive oxide layer onto the second electrochromic oxide layer.

Any conductive oxide layer material may be used, but preferred conductive oxide materials include, for example indium oxide, indium-tin oxide, tin oxide, and zinc oxide. Indium oxides are preferred. Electrochromic oxide materials include but are not limited to tungsten oxides, iridium oxides, and vanadium oxides.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus for depositing a liquid monomer as a layer, comprising:
   (a) a moving substrate,
   (b) a vacuum chamber placed about said moving substrate,
   (c) means for degassing the liquid monomer, and
   (d) means for depositing a first layer including a nozzle for flowing the degassed liquid monomer onto said moving substrate within the vacuum chamber.

2. The apparatus as recited in claim 1, further comprising:
   additional means for vacuum depositing metal or for depositing oxide onto said first layer, and a means for depositing further layers of degassed liquid monomer onto said vacuum deposited metal or oxide, together with means for curing the degassed liquid monomer layers.

3. The apparatus as recited in claim 1, further comprising a mechanical liquid monomer spreading apparatus within the vacuum chamber.

4. The apparatus as recited in claim 3 wherein said mechanical liquid monomer spreading apparatus is selected from the group of roll coaters, wire wound rods, doctor blade coaters, and slotted die coaters.

5. The apparatus as recited in claim 1, further comprising:
   means for curing, within the vacuum chamber, said liquid monomer and forming a first solid polymer layer.

6. The apparatus as recited in claim 1, further comprising:
   additional means for vacuum depositing a metal or oxide layer onto said first layer within the vacuum chamber.

7. An apparatus for depositing a liquid monomer as a layer, comprising:
   (a) a moving substrate,
   (b) a vacuum chamber placed about said moving substrate,
   (c) means for degassing the liquid monomer,
   (d) means for depositing a first layer of degassed liquid monomer onto said moving substrate within the vacuum chamber, and
   (e) a mechanical liquid monomer spreading apparatus within said vacuum chamber for spreading deposited degassed liquid monomer on said moving substrate.

8. The apparatus as recited in claim 7, wherein said mechanical liquid monomer spreading apparatus is selected from the group of roll coaters, wire would rods, doctor blade coaters, and slotted die coaters.

9. The apparatus as recited in claim 7, further comprising:
   additional means for vacuum depositing a metal or oxide layer onto said first layer within the vacuum chamber.

10. The apparatus as recited in claim 9, further comprising:

means for depositing further layers of degassed liquid monomer onto said vacuum deposited metal or oxide, together with means for curing the degassed liquid monomer layers.

11. An apparatus for depositing a liquid monomer as a layer, comprising:

(a) a moving substrate, (b) a vacuum chamber placed about said moving substrate, (c) means for degassing the liquid monomer, (d) means for depositing a first layer including a nozzle for flowing the degassed liquid monomer onto said moving substrate within the vacuum chamber, and (e) a means for vacuum depositing a metal or oxide layer onto said monomer layer.

12. The apparatus as recited in claim 11, further comprising a mechanical liquid monomer spreading apparatus within the vacuum chamber.

13. The apparatus as recited in claim 12, wherein said mechanical liquid monomer spreading apparatus is selected from the group of roll coaters, wire wound rods, doctor blade coaters, and slotted die coaters.

14. The apparatus as recited in claim 11, further comprising:

means for depositing further layers of degassed liquid monomer onto said vacuum deposited metal or oxide, together with means for curing the degassed liquid monomer layers.

\* \* \* \* \*